United States Patent [19]
Tsumita et al.

[11] 3,888,837
[45] June 10, 1975

[54] TUBERCULIN ACTIVE PROTEINS AND PEPTIDES FROM THE CELLS OF TUBERCLE BACILLI

[75] Inventors: Toru Tsumita; Seishi Kuwabara, both of Tokyo, Japan

[73] Assignee: Mitsui Pharmaceuticals, Incorporated, Tokyo, Japan

[22] Filed: June 28, 1973

[21] Appl. No.: 374,663

[52] U.S. Cl. ............... 260/112.5; 195/4; 195/29; 260/112 R
[51] Int. Cl. ..... C07c 103/52; C07g 7/00; C08h 1/00
[58] Field of Search .......... 260/112.5, 112 R; 195/4, 195/29

[56] References Cited
OTHER PUBLICATIONS
Rzucidlo et al.: Chem. Abstr., 72, 29006d (1970).
Daniel et al.: Chem. Abstr., 72, 107128m (1970).
Stoeckl et al.: Chem. Abstr. 60, 9763g (1964).
Rhodes: Chem. Abstr. 56, 9204e (1962).

*Primary Examiner*—Lewis Gotts
*Assistant Examiner*—Reginald J. Suyat
*Attorney, Agent, or Firm*—Fisher, Christen & Sabol

[57] ABSTRACT

Tuberculin active proteins and peptides which have the following linkage

—Asp—Gly—Ser—Glu—Met— as the active functional group and a process for preparing thereof from the cells of tubercle bacilli.

4 Claims, No Drawings

TUBERCULIN ACTIVE PROTEINS AND PEPTIDES FROM THE CELLS OF TUBERCLE BACILLI

The present invention is concerned with pure tuberculin proteins and peptides which have the linkage —Asp—Gly—Ser—Glu—Met— as the active functional group.

It is well known that purified protein derivative (PPDs) purified from extracellular old tuberculin (OT) have been used exclusively for the diagnosis of tuberculosis. Unfortunately, in addition to tuberculin protein, PPDs contains other inactive proteins, nucleic acids, polysaccharides and fatty acids. As pure tuberculin proteins have not been obtained, their physico-chemical properties and amino acid sequences have not been determined.

The present inventors have succeeded in isolating tuberculin proteins from the cells of tubercle bacilli and have obtained them as crystalline forms. Subsequently the amino acid sequences of the crystalline tuberculin proteins have been determined. Besides, they have obtained the active peptides by hydrolyzing the crystalline tuberculin proteins.

From the results of the investigation, it has been found that the tuberculin activity is closely connected with the aforesaid functional group in proteins and peptides.

The tuberculin proteins of the present invention are prepared from the cells of tubercle bacilli by treating with an organic solvent to obtain water-soluble proteins. The active proteins are mainly purified onto DEAE-cellulose and Sephadex by column chromatography.

The materials used in the present invention are obtained from human-, bovine- and avian-type *Mycobacterium tuberculosis* including BCG and others. The crystalline tuberculin protein from human type *Mycobacterium tuberculosis* strain Aoyama B is composed of 89 amino acid residues per molecular or 9,700g. On the other hand, the active protein from BCG is composed of 135 amino acid residues per molecular or 13,500g. The obtainable tuberculin proteins depend upon the starting materials used in the present method.

The organic solvents used for purification are acetone, methanol or acetic acid. Another organic solvent, such as ketone, alcohol or carboxylic acid is also employed. These solvents may, of course, be used with water.

The materials without lipo-soluble component are dialyzed against buffers, pH 5.5–7.8 such as tris(hydroxymethyl)aminomethane—hydrochloric acid buffer, pH 7.0 containing ethylenediamine tetraacetic acid, or sodium phosphate, dibasic/pottasium phosphate, monobasic buffer, pH 7.2 containing ethylenediamine tetraacetic acid, and the like.

The dialyzed proteins are purified onto column chromatography, two dimensional high voltage paper electrophoresis followed by paper chromatography. Especially, column chromatography or gel filtration is preferably used, such as diethylaminoethyl(DEAE)-cellulose, aminoethyl(AE)-cellulose, ECTEOLA-cellulose, Sephadex G–150 or Sephdex G–200 column. The dialyzed proteins are eluted with the aforesaid buffers.

The crystalline tuberculin proteins of the present invention are soluble in water and their molecular weights 3,000–35,000 are depending upon the starting materials. Tuberculin skin tests indicate that the tuberculin proteins of the present invention are 100 times potent that that of PPDs against guinea pigs sensitized with heat-killed *Mycobacterium tuberculosis* strain Aoyama B or BCG.

The tuberculin peptides of the present invention are prepared by hydrolyzing the above crystalline tuberculin proteins and are obtained by fractionating their hydrolysates by chromatography.

The tuberculin proteins may be hydrolyzed chemically or enzymatically. The chemical hydrolysis is carried out with a mineral acid. The enzymatic hydrolysis is carried out with a proteolytic enzyme such as trypsin, chymotrypsin, pepsin, papain, bacterial proteinases, carboxypeptidase A or B, and the like.

The resulting hydrolysates are fractionated with column chromatography, paper chromatography, high voltage paper electrophoresis, gel filtration, and the like.

The gel filtration is carried out by elution with an ammonium acetate buffer, pH 5.9 through Sephadex G–25 or CM-Sephadex, with an ammonium acetate buffer, pH 4.5 through SE-Sephadex C–50 or with a pyridine-acetic buffer, pH 3.1 through Dowex 50–X2 or 1–X2.

The tuberculin peptides of the present invention are white crystalline solids, soluble in water and about 500–3000 in the molecular weights.

Tuberculin skin tests indicate that the tuberculin peptides of the present invention show appreciable values of the of PPDs against guinea pigs sensitized with heat-killed *Mycobacterium tuberculosis* strain Aoyama B or BCG.

The following examples illustrate preparation and purification of the tuberculin proteins and peptides of the present invention.

EXAMPLE 1

The cultured cells (100g) of *Mycobaceterium tuberculosis* strain Aoyama B were killed by heating at 120°C for 30 minutes. The cells were separated from the culture medium by filtration, then sonically disrupted and treated with acetone. The resultant residue was dialyzed against 0.001M tris(hydroxymethyl)aminomethane—hydrochloric acid buffer, pH 7.0 containing 0.0001 M ethylenediamine tetraacetic acid.

Dialyzed residues were chromatographed on DEAE-cellulose. Elution was carried out in a sodium chloride gradient. Virtually all of the tuberculin activity was found in the second protein fraction. Further chromatography on Sephadex G–200 was carried out in the same buffer as before and fractionated into three fractions.

Nearly all of the active material was found in the major protein fraction. The active material crystallized spontaneously when the solution was kept at 4°C in the mixed solution of the same buffer with purified acetone.

From 100g cells (wet weight) of *Mycobacterium tuberculosis* strain Aoyama B, 20mg of crystalline tuberculin protein was obtained.

The tuberculin protein thus obtained was composed of 89 amino acid residues and its amino acid sequence was determined as follows.

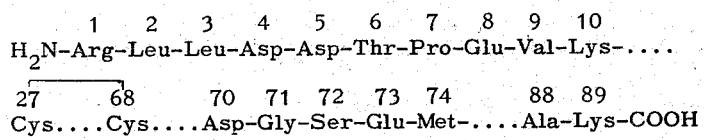

Tuberculin skin test showed that this tuberculin protein was 100 times potent than that of PPDs against guinea pigs sensitized with heat-killed strain Aoyama B or BCG.

EXAMPLE 2

The tuberculin active protein having the molecular weight of about 13,500 was also prepared from BCG by the same method as in Example 1.

The amino acid sequence of this tuberculin protein which was composed of 135 amino acid residues was determined. The N-terminal and C-terminal amino acids and its primary structure were essentially the same as in the protein from heat-killed strain Aoyama B.

Tuberculin skin test indicated that this tuberculin protein shows appreciable value of that from heat-killed *Mycobacterium tuberculosis* Aoyama B against guinea pigs sensitized with heat-killed Aoyama B or BCG.

EXAMPLE 3

The crystalline tuberculin protein obtained in Example 1 was enzymatically hydrolyzed at 37°C for 6 hours in the 1 percent trypsin solution at pH 8.4.

Two dimensional high voltage paper electrophoresis of the resultant hydrolysates on Whatman paper was carried out at 75 V/cm in pyridine buffer, pH 4.5 and followed by paper chromatography which was carried out in the butanol-acetic acid-water (4;1:4, by vol.).

The above development resulted in the separation of several active peptides. One of them was a pentapeptide having the following amino acid sequence.

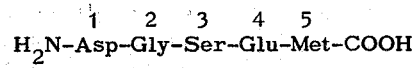

Another was an oligopeptide having the molecular weight of about 950.

Tuberculin skin tests showed that these tuberculin peptides had 1–10 percent activities of the starting tuberculin protein.

EXAMPLE 4

The crystalline tuberculin protein obtained in Example 1 was hydrolyzed in the 0.5 percent chymotrypsin solution. The resultant hydrolysates were chromatographed on column of Sephadex G–25, elution being carried out with ammonium acetate buffer, pH 5.9. The tuberculin active peptides thus obtained was further fractionated with pyridineacetic acid buffer, pH 3.1 on Dowex 1–X2 column.

The tuberculin pentapeptide thus obtained was the same as in Example 3.

EXAMPLE 5

The tuberculin protein in Example 2 was treated the same as before. The same tuberculin pentapeptide as in Example 3 was also obtained.

What is claimed is:

1. A tuberculin active simple protein from *Mycobacterium tuberculosis* strain Aoyama B which is composed of 89 amino acid residues and whose amino acid sequence is as follows

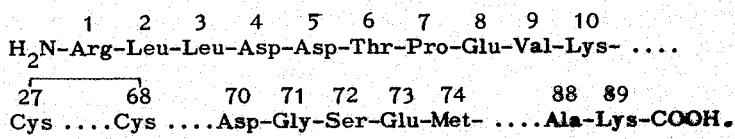

2. A tuberculin active pentapeptide whose amino acid sequence is as follows

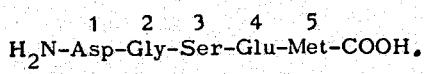

3. A process for preparing tuberculin active simple proteins having the following tuberculin active group

which comprises (a) treating *Mycobacterium tuberculosis* strain Aoyama B with an organic solvent, (b) dialyzing the resultant material against a buffer of pH 5.5–7.8 containing ethylenediamine tetraacetic acid and (c) fractionating the resultant dialysate by chromatography and/or gel filtration.

4. A process for preparing tuberculin active simple proteins having the following tuberculin active group

which comprises (a) treating BCG with an organic solvent, (b) dialyzing the resultant material against a buffer of pH 5.5–7.8 containing ethylenediamine tetraacetic acid and (c) fractionating the resultant dialysate by chromatography and/or gel filtration.

* * * * *